April 14, 1931. J. J. LAWLER 1,801,094
THERMOSTATIC MIXING VALVE
Filed July 22, 1930  2 Sheets-Sheet 1
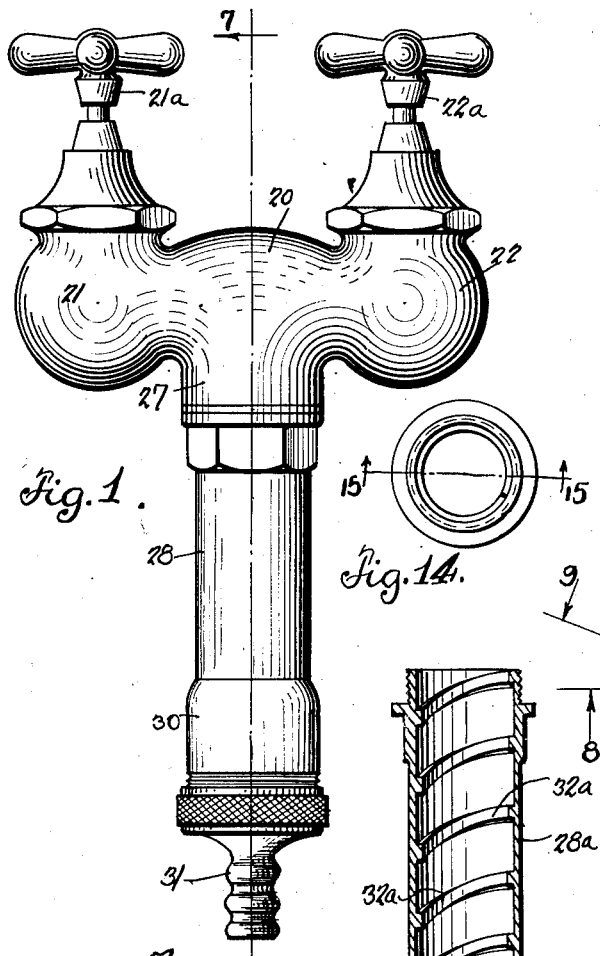
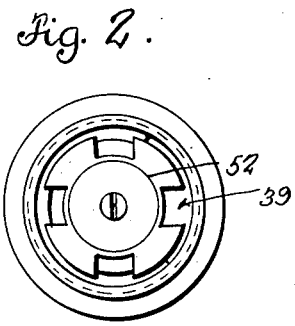
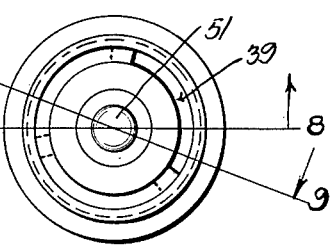
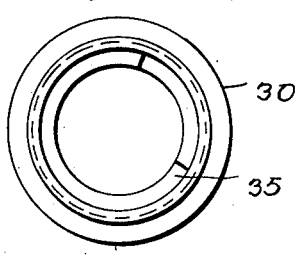
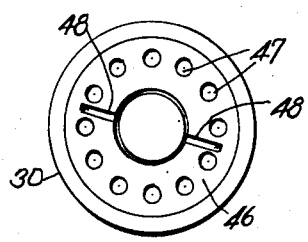
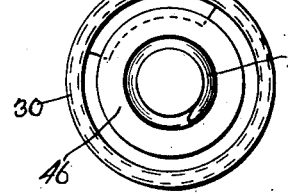
Inventor
James J. Lawler.
By
Attorneys

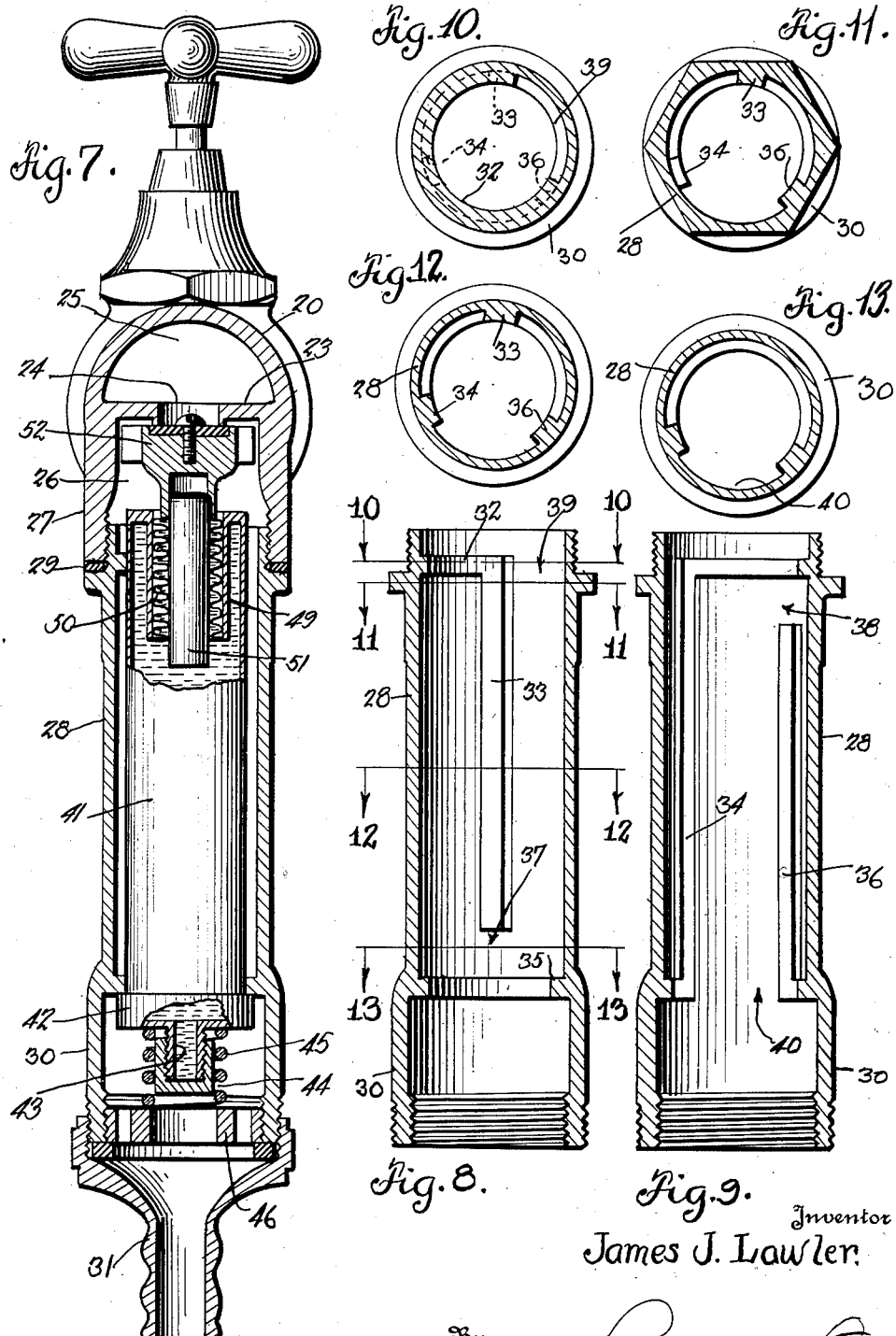

Patented Apr. 14, 1931

1,801,094

UNITED STATES PATENT OFFICE

JAMES J. LAWLER, OF MOUNT VERNON, NEW YORK

THERMOSTATIC MIXING VALVE

Application filed July 22, 1930. Serial No. 469,844.

This invention relates to certain new and useful improvements in thermostatic mixing valves.

The primary object of the invention is to provide a valve construction for the mixing of hot and cold water having a thermostatically operated device associated therewith to control the flow of hot water from the hot water valve whereby the desired temperature of water flowing through the valve construction is obtainable.

A further object of the invention is to provide a thermostatic mixing valve construction wherein a nozzle section extending from a valve casing houses a variably tensioned thermostatic element that is operatively engaged with a valve to control the flow of hot water into the nozzle section, the latter being so designed and related to the thermostatic element as to cause a tortuous flow of water through the device for the more effective operation of the thermostatic element.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a front elevational view of a thermostatic mixing valve constructed in accordance with the present invention, showing the valve casing having hot and cold water control valves and a nozzle extension from the casing;

Figure 2 is an end elevational view of the upper end of the nozzle section removed from the valve casing and illustrating the thermostatically operated valve for controlling the flow of hot water from the valve casing into the nozzle extension;

Figure 3 is an end view of the upper end of the nozzle section with the valve removed and illustrating the upper end of the thermostatic element that operates the valve;

Figure 4 is an end view of the upper end of the nozzle section with the thermostatic element removed;

Figure 5 is an end elevational view of the lower end of the nozzle section with the thermostatic elements therein and illustrating the spring for varying tension on the thermostatic element;

Figure 6 is an end elevational view, similar to Figure 5 showing a disk plate threaded into the lower end of the nozzle section for varying tension on the spring;

Figure 7 is a vertical sectional view taken on line 7—7 of Figure 1 showing the thermostatic element within the nozzle section and engaged with the valve that controls the flow of hot water through the nozzle section;

Figure 8 is a vertical cross-sectional view taken on line 8—8 of Figure 3;

Figure 9 is a vertical cross-sectional view taken on line 9—9 of Figure 3; Figures 8 and 9 showing the ribbed inner face of the nozzle section to cause a tortuous flow of water therethrough;

Figure 10 is a cross-sectional view taken on line 10—10 of Figure 8;

Figure 11 is a cross-sectional view taken on line 11—11 of Figure 8;

Figure 12 is a cross-sectional view taken on line 12—12 of Figure 8;

Figure 13 is a cross-sectional view taken on line 13—13 of Figure 8;

Figure 14 is an end elevational view of another form of nozzle section, and

Figure 15 is a cross-sectional view taken on line 15—15 of Figure 14, showing a spiral rib arrangement on the inner face of the nozzle section to effect a tortuous flow of water therethrough.

The thermostatic mixing valve comprises a valve casing 20 having globe valves 21 and 22 associated with opposite ends thereof, the valve 21 including a control handle 21a for hot water to enter the valve casing 20 while the valve 22 has a control handle 22a for cold water. A partition 23 in the valve casing 20 has a valve opening 24 therein through which hot water from the chamber 25 above the partition 23 flows; the globe valve 21 being in communication with the chamber 25. Cold water from the globe valve 22 enters the chamber 26 below the partition 23 for mixing with the hot water before discharge from the device. The tubular outlet 27 of the valve casing 20 provides the chamber 26 and is internally threaded at its lower end as shown in Figure 7 for the attachment of the elongated nozzle section 28 that has a packing connection 29 therewith. An annular enlargement 30 is carried by the lower end of the nozzle section 28 and is externally threaded for the attachment of a nipple 31 having a reduced outlet and to which a spray hose or the like may be attached as will at once be understood from an inspection of Figures 1 and 7.

As shown in Figures 8 to 13, the inner face of the nozzle section 28 is ribbed for cooperation with a thermostatic element presently to be described whereby water flowing through the nozzle section is caused to travel in an up and down or tortuous path, an annular horizontal rib 32 extending through an arc of substantially 270° being provided on the inner face of the nozzle section, adjacent its upper end. Longitudinal ribs 33 and 34 extend from each end of the arcuate rib 32, the rib 33 at its lower end terminating in spaced relation to an annular rib 35 that extends through an arc of substantially 270° and which is arranged adjacent the upper end of the enlargement 30 of the nozzle extension. The other longitudinal rib 34 is engaged with one end of the arcuate rib 35, the two arcuate ribs 32 and 35 being so related that the longitudinal rib 33 is substantially midway the ends of the arcuate rib 35. A longitudinal rib 36 rises from the other end of the arcuate rib 35 and terminates in spaced relation to the upper arcuate rib 32, the shortening of the lower end of the longitudinal rib 33 providing a lower horizontal passage 37 while the shortening of the upper end of the rib 36 provides an upper horizontal passage 38, the spacing of the ends of the arcuate rib 32 providing a side inlet 39 at the upper end of the nozzle section 28, while the spacing of the lower ends of the arcuate rib 35 provides an outlet 40 from the nozzle section.

A thermostatic element is confined within the nozzle section 28 and extends into the outlet 27 of the valve casing 20 for operating a valve associated with the valve opening 24, the thermostatic element also being associated with the ribbed inner face of the nozzle section for causing water flowing therethrough to travel in a tortuous path for the more effective operation of the thermostatic element. As shown in Figure 7, the thermostatic element is in the form of a tube 41 having a shouldered enlargement 42 at its lower end to be moved into abutting engagement with the arcuate rib 35, a threaded nipple 43 providing a filling opening for the tube 41 into which fluid that is sensitive to expansion and contraction is introduced, the nipple 43 being closed by a screw cap 44. A coil spring 45 surrounds the nipple and cap, the upper end thereof being engaged with the lower end of the tube 41 while the lower end of the spring is engaged by a screw ring 46 threaded into the lower end of the nozzle enlargement 30 and having a circular series of outlet openings 47 and also slotted as at 48 for the use of a spanner wrench in mounting the same.

The upper end of the tube 41 is provided with a central opening from which depends an annular collar 49 that confines an expansible tube 50, the lower end of which is attached to the lower end of the collar in a manner to place the tube 41 and expansible tube 50 in communication with each other. A plug 51 is located in the expansible tube 50 to occupy the major portion of the interior thereof and to render the fluid in the expansible tube more sensitive to heat and cold conditions, the upper end of the plug 51 normally extending above the upper end of the tube 41 while the upper end of the expansible tube 50 overlies the upper end of the plug 51 and is attached thereto in any suitable manner. A valve 52 is loosely seated upon the upper end of the plug 51 and is normally engaged with the valve opening 24 for the control of the hot water flowing from the chamber 25 in the valve casing through the nozzle 28.

Cold water from the globe valve 22 freely enters the chamber 26 for passage through the nozzle 28 to the outlet nipple 31. Hot water from the valve 21 enters the chamber 25 and pressure thereof unseats the valve 52 by shifting the thermostatic element 41 against the tension of the spring 45 to enter the chamber 26 and by adjusting the tension on the spring 45 by the screw disk 46, the temperature of the water discharged through the nipple 31 is controlled. The water from the chamber 26 flows through the space 39 between the ends of the arcuate rib 32 and longitudinal ribs 33 and 34 in a downward direction into contact with the arcuate rib 35, it being understood that the thermostatic element 41 is in wiping engagement with all of the ribs, the water then flowing through the horizontal passage 37 defined by the lower end of the rib 33 and arcuate rib 35 to flow upwardly between the other side of the rib 33 and rib 36, water then flowing through the lateral passage 38 defined by the upper end of the rib 36 being spaced from the upper arcuate ring 32 and thence downwardly between the ribs 34 and 36 for passage through the space 40 between the ends of the lower arcuate rib 35 to enter the enlargement 30 at the lower end of the nozzle section 28 and escape through the openings 47 in the screw disk 46 and nipple 31. By causing the water to flow in a tortuous path through the nozzle section 28, the same is retained in the nozzle section for a greater period of time to produce quicker action of the thermostatic element to assure discharge of water at the proper temperature for which the device has been set.

A modified form of nozzle section is shown in Figures 14 and 15, the nozzle 28a having a spiral rib 32a carried by the inner face thereof with the thermostatic element 41 moving in wiping contact therewith so that the water is caused to flow in a spiral path in passing through the nozzle section.

From the above detailed description of the invention, it is believed that the construction and operation thereof will at once be apparent, and while there is herein shown and described the preferred embodiment of the invention, it is nevertheless to be understood that minor changes may be made therein without departing from the spirit of the invention or the scope of the subjoined claims.

I claim:—

1. Valve operating mechanism comprising a valve casing, a valve for controlling the flow of hot water therethrough, an outlet nozzle carried by the casing, a plurality of arcuate and longitudinally extending ribs on the inner face of the nozzle and a cylindrical thermostatic element in the nozzle wipingly engaging the ribs and engaged with the valve, said ribs defining a tortuous passage between the nozzle and thermostatic element.

2. Valve operating mechanism comprising a valve casing, a valve for controlling the flow of hot water therethrough, an outlet nozzle carried by the casing, a plurality of arcuate and longitudinally extending ribs on the inner face of the nozzle and a cylindrical thermostatic element in the nozzle wipingly engaging the ribs and engaged with the valve, said ribs defining a tortuous passage between the nozzle and thermostatic element, and a resilient mounting for the thermostatic element.

3. Valve operating mechanism comprising a valve casing, a valve for controlling the flow of hot water therethrough, an outlet nozzle carried by the casing, a plurality of arcuate and longitudinally extending ribs on the inner face of the nozzle and a cylindrical thermostatic element in the nozzle wipingly engaging the ribs and engaged with the valve, said ribs defining a tortuous passage between the nozzle and thermostatic element, and a variably tensioned mounting for the thermostatic element.

4. Valve operating mechanism comprising a valve casing, a valve for controlling the flow of hot water therethrough, an outlet nozzle carried by the casing, a plurality of arcuate and longitudinally extending ribs on the inner face of the nozzle and a cylindrical thermostatic element in the nozzle wipingly engaging the ribs and engaged with the valve, said ribs defining a tortuous passage between the nozzle and thermostatic element, the thermostatic element having an opening in its upper end, an expansible tube set into the opening in communication therewith, and a plug in the expansible tube directly engaged with the valve.

5. Valve operating mechanism comprising a valve casing, a valve for controlling the flow of hot water therethrough, an outlet nozzle carried by the casing, a plurality of arcuate and longitudinally extending ribs on the inner face of the nozzle and a cylindrical thermostatic element in the nozzle wipingly engaging the ribs and engaged with the valve, said ribs defining a tortuous passage between the nozzle and thermostatic element, and a resilient mounting for the thermostatic element, the thermostatic element having an opening in its upper end, an expansible tube set into the opening in communication therewith, and a plug in the expansible tube directly engaged with the valve.

In testimony whereof I affix my signature.

JAMES J. LAWLER.